April 27, 1948.  F. S. ROSTLER ET AL  2,440,299
METHOD OF COMPOUNDING RUBBERY MATERIALS
Filed Jan. 26, 1945
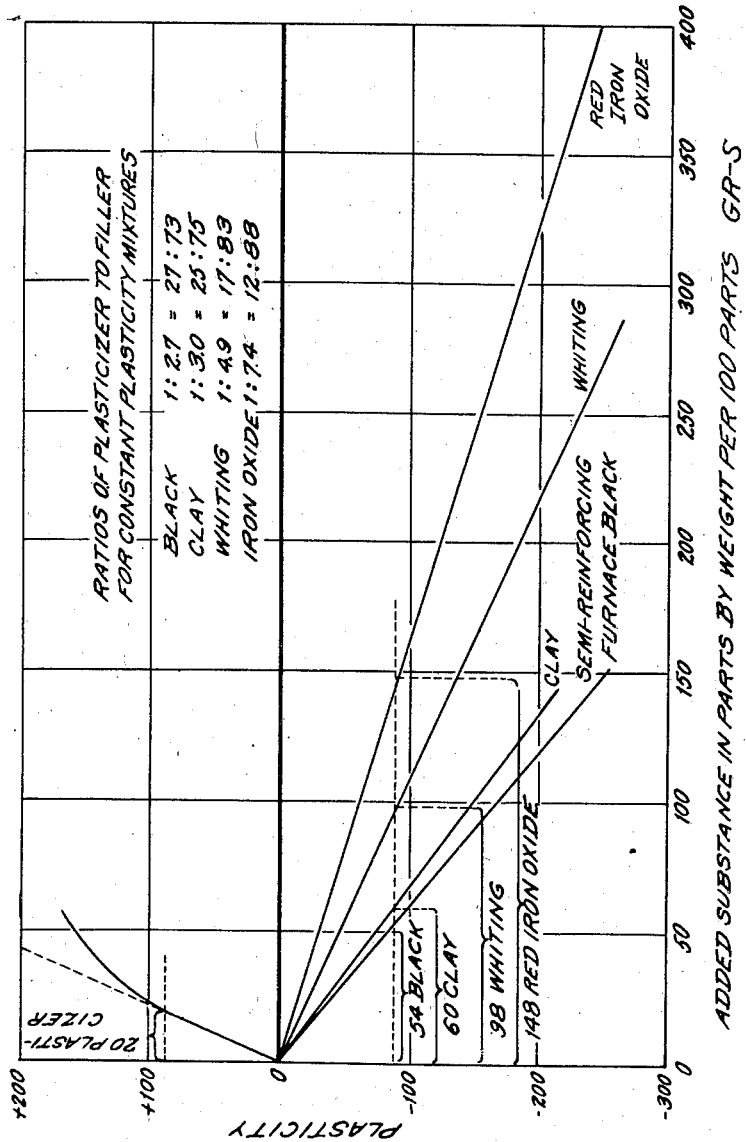
INVENTORS
FRITZ S. ROSTLER
HUBERT I. DUPONT
BY
Hoguet, Neary & Campbell
ATTORNEYS Patented Apr. 27, 1948

2,440,299

UNITED STATES PATENT OFFICE 2,440,299

METHOD OF COMPOUNDING RUBBERY MATERIALS

Fritz S. Rostler, Newark, and Hubert I. du Pont, Wilmington, Del., assignors to Wilmington Chemical Corporation, New York, N. Y., a corporation of Delaware Application January 26, 1945, Serial No. 574,745

7 Claims. (Cl. 260—36)

This invention relates to the compounding of thermoplastic masses, such as rubber or rubber-like masses.

In general, rubber or rubber-like compositions contain a substantial amount of fillers, which fillers are incorporated into the rubber in the form of powders or loose pellets or beads. These compositions also utilize a certain amount of plasticizer or rubber extenders or both, which plasticizers or extenders may be in liquid or thermoplastic form. These features hold not only for natural rubber, but also for synthetic rubbers or artificial rubbers as they are sometimes called, thermoplastics, elastomers which are both extensible and elastic, reclaimed natural and synthetic rubbers, and mixtures thereof. Since the so-called synthetic rubbers, as a rule, are compounded with considerably larger amounts of fillers and plasticizers than natural rubber, the present invention is most helpful in compounding synthetic rubbers.

The rubber or similar material is usually made thermoplastic before incorporating either the filler or the plasticizer. It may be made plastic by milling on an open rubber mill or in an internal mixer. The operation of making the rubber thermoplastic is called mastication. The physical properties of rubber or rubber-like goods, their mechanical strength and their resistance to tear and abrasion, depend largely on the completeness or extent of dispersion of the fillers and other ingredients in the rubber or plastic mass. In order to obtain good dispersion, the plastic mass has to be plastic enough during compounding to accept the filler readily, but on the other hand, hard enough to break up the filler pellets or beads or agglomerates and to grind them into their smallest individual particles.

Synthetic rubbers now on the market are, as a rule, much more difficult to compound than either natural or reclaimed natural rubber. It is difficult to attain the same degree of thermoplasticity with synthetic rubbers as that attained with natural rubber by milling. The difficulty is associated with the inherent property of the presently produced polymer or copolymer synthetic rubbers of being much more resistant to milling than natural rubber. While natural rubber becomes more thermoplastic during the milling operation, synthetic rubbers, for instance those of the butadiene-styrene and the butadiene-acrylonitrile copolymer types, are much less susceptible to this effect. In milling, there is a greater consumption of power and a greater development of heat with synthetic rubbers than with natural rubber.

The incorporation of dry powder or pelletized fillers stiffens the rubber or other thermoplastic mass and the incorporation of plasticizers or plasticizer-extenders decreases the viscosity of the rubber mix. The latter effect may be carried too far; it then interferes with the formation of a continuous band around the rubber mill roll, and may produce a sticky mass which is too soft for successful incorporation of fillers by milling.

In a closed mixer, excessive heat development results from the addition of a dry filler, alone. If the plasticizer or extender is added alone, the mix may slip between the kneading blades. This may be due to the lubricating action of the plasticizer and the breaking up of the plastic mass into crumbs or lumps. Loss of milling time may be the result.

According to the accepted practice, the fillers and plasticizers are incorporated into the rubber separately. In fact, rubber compounders are warned against pre-mixing the fillers with the plasticizers.

The separate incorporation of powdered fillers and plasticizers or plasticizer-extenders is associated with many disadvantages. It ties up the mixing equipment for an undue amount of time. It consumes an undue amount of power. The consumption of power during the milling cycle is very uneven. This disadvantage is especially noticeable where many mills or mixers are on the same power line. The power consumption goes up during the initial breakdown (mastication), goes down during the incorporation of the plasticizer, and goes up again when the filler is added. Separate fillers and plasticizers also may require an undue amount of shipping container space and handling. The working conditions are unpleasant in that the atmosphere is very dirty when the usual dry fillers are used whether in the powder or pelletized form.

Various attempts have been made to overcome the above discussed drawbacks. A known method is to first mix together the total amount of fillers and plasticizers to be used in the particular formulation and then to dump this filler-plasticizer mixture into the thermoplastic mass. This and similar methods leave much to be desired. They yield finished products which are very often of lower quality than products in which the filler and plasticizer have been incorporated separately. The following example illustrates this point: Two rubber formulations of exactly the same composition were compounded, in the one case by first incorporating the filler and plasticizer separately, and, in the other case, by mixing the filler with the plasticizer first and then incorporating this blend. The composition of each formulation was (amounts are in parts by weight):

| | |
|---|---|
| GR–S (butadiene-styrene copolymer) | 100 |
| Stearic acid | 0.5 |
| Semi-reinforcing black (furnace black) | 60 |
| An unsaturated hydrocarbon extender-plasticizer | 40 |
| Zinc oxide | 5 |
| Benzothiazyl disulfide | 1.5 |
| Diphenyl guanidine | 0.25 |
| Sulfur | 3 |

The unsaturated hydrocarbon extender-plasticizer is composed of approximately 90% carbon and 10% hydrogen, and contains no components boiling below 320° F.; it is a semi-viscous oil at room temperature, and at 220° F. has a viscosity of 21 centipoises. It is described in the literature, e. g., in India Rubber World, vol. 104, (Aug., 1941), pp. 47-51.

Standard slabs were cured and tested according to A. S. T. M. procedures. The product in which the filler and extender had been separately incorporated had a tensile strength 300 pounds per square inch higher than the product in which the filler and extender had been premixed and then incorporated.

It has now been found however that, by employing a new composition comprising both filler and plasticizer or plasticizer-extender, the best quality products can be obtained, and at the same time a substantial saving of time, power and handling will result as compared to the separate incorporation of the filler and the plasticizer or extender. The use of such compositions greatly improves working conditions in the compounding room, and makes possible the compounding of rubber and other thermoplastic masses by simultaneously incorporating filler components and plasticizer components to give high quality products.

One of the objects of this invention is to facilitate the compounding of rubbers with fillers and plasticizers.

Another object is to provide a combination of filler and plasticizer which will overcome difficulties heretofore encountered in simultaneously incorporating conventional dry fillers and liquid or highly thermoplastic materials into rubbers, and the like.

Another object is to provide a process and a product which will save time, power and handling in compounding rubber.

Other objects and advantages will appear from the description of the invention or process and product set forth below.

The new filler-plasticizer compositions comprise one or more fillers and one or more plasticizers; the proportions of total filler to total plasticizers are different for different plasticizers and for different fillers. It has now been found that the proportion to be used in any particular composition depends on the relative influence on the plasticity of the plastic mass of the two types of ingredients, the filler type on the one hand and the plasticizer type on the other, and that for best quality products, the proportion of filler to plasticizer in the filler-plasticizer composition should be such that, the addition of the latter to the masticated rubber or similar plastic mass will not increase the plasticity thereof above the plasticity of the masticated rubber or similar plastic mass, alone. That is, that the fillers and plasticizers must be present in such proportions that the plasticizing effect of the plasticizer is not greater than the stiffening effect of the filler. Best results are obtained when fillers and plasticizers are present in such proportions that the incorporation of the filler-plasticizer composition into the plastic mass does not raise the plasticity of the resulting mass substantially above the plasticity of the masticated rubber or other plastic mass containing no filler or plasticizers, and when a very uniform filler-plasticizer composition is employed, so that the local changes in plasticity of the resulting mass are kept at a minimum. Thus the influence of infinitesimally small local effects due to deviations from the desired ratio of plasticizers and filler in each particle of the composition are kept at a minimum during the milling process. A filler-plasticizer composition having a proportion of filler to plasticizer which results in a stiffening effect will also give good results.

Alternatively, a filler-plasticizer composition which results in a plasticizing effect may be used advantageously, if enough filler is first incorporated in the plastic mass so that the total effect of the filler and filler-plasticizer composition does not increase the plasticity substantially above the plasticity of the masticated rubber or other plastic mass containing no filler and no plasticizer.

The particular proportions of filler and plasticizer in the new filler-plasticizer compositions of the invention may readily be determined by a graphic means. Figure 1 is a graph of the effect of an extender-plasticizer and of several usual fillers upon the plasticity. The extender-plasticizer is an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining. Its molecular weight is in the range of 300 to 1,000. It is described in U. S. Patent 2,399,694 at page 2, column 2, line 68 to page 3, column 1, line 66. On the ordinate are plotted the increase and decrease of plasticity, using as a reference point (zero on the scale) the initial plasticity of the plastic mass. In this case, the butadiene-styrene rubber (also known as GR–S) was masticated ten minutes on a laboratory mill before testing its initial plasticity. The plasticity was measured on a Scott plastometer, by the decrease in thickness of a 0.600-inch thick test piece, placed between parallel platens, under 15 pounds pressure for 2½ minutes at 100° C.; scale units are one-thousandths of an inch. Other types of plasticity measurement can be used equally well, since the relative position on the graph is the important characteristic. On the abscissa are plotted the parts by weight of plasticizer or filler tested, relative to 100 parts of the plastic mass; i. e. of the above mentioned GR–S.

By separate tests, the characteristics of each component are determined for the particular plastic mass; they are then plotted on the one graph for the particular rubber or plastic mass. The co-ordinates of each point are then the amounts of plasticizer or filler used with 100 parts of the plastic mass or rubber and the difference in plasticity between that of the resulting mixture and that of the plastic mass alone. The curves for each component are obtained by connecting the points for a series of compositions containing increasing amounts of that component.

As is evident from Figure 1, all points for the powdered dry fillers are connected by straight lines; i. e. the change in plasticity is directly proportional to the amount added. The graph representing the change of plasticity brought about by incorporating plasticizer is curved, but in the practical range, it is a substantially straight line (indicated by the broken line in the figure). The part of any of the various fillers which is equivalent in terms of influence on plasticity to a given number of parts of the particular plasticizer (the plasticity-equivalent ratio) can then be read from the graph. One series of these equivalent amounts is indicated by brackets on the figure. Using such an equivalent of plasticizer to filler or slightly more filler will result in constant plasticity or slight stiffening of the mix, independent of the amount of the mixture added to masticated rubber or other thermoplastic mass, within the practical range. Analogous procedures may be used to determine the proportions of mixtures of plasticizers, or mixtures of fillers, or both, for the new filler-plasticizer compositions.

The advantages of using the plasticizer-filler compositions having proportions in accordance with the invention are very marked. There is a marked saving in milling time over the practice of separate incorporation, and products having uniform physical properties are obtained; these are of the best quality obtainable from the ingredients used. There is much lower heat development in the milling process; thus there is much less deterioration of the plastic mass during milling. The overall power consumption of the milling process is much lower, and it is not subject to the great fluctuations due to extreme thickening and then thinning of the plastic mass. Other advantages are easier handling and cleaner working conditions. If the filler-plasticizer composition is made up before shipping, there is a saving of steel containers as compared with shipping and handling of fillers and plasticizers. These advantages are associated with the substitution of a true dustless product of high bulk weight as compared with two products which are relatively difficult to handle. For many filler-plasticizer compositions, the reduction of bulk is of the order of ⅓ or more of the sum of the volumes of the individual components.

An alternative product and method in accordance with the invention, is to prepare a filler-plasticizer composition which would have a plasticizing effect on the plastic mass when incorporated. However, prior to its incorporation, enough filler alone would be incorporated in the rubber or related mass to substantially offset the softening or positive plasticizing effect of the composition. Some of the advantages of the invention such as lower time and power consumption will also be partially achieved thereby.

If a finished compound which is softer than the initial plastic mass is desired, additional plasticizer may be added, but only after all fillers or filler-plasticizer compositions have been first incorporated. In terms of the above graph, the plasticity should in no stage of the filler incorporation be substantially above the zero value of the ordinate. To do so might cause such uneven plasticity in the mass that uniform dispersion of the filler would be difficult if not impossible to obtain.

Only certain known fillers may be used in the preformed composition to be utilized in compound rubber and the like in accordance with the invention. Mixtures of fillers may be used in the preformed compositions or in the compounded thermoplastic mass. The fillers or mixture thereof may be, for example, silicate types, such as clay and talc; water insoluble salt types, such as calcium carbonate (whiting) magnesium carbonate, barium sulfate; oxide types, such as magnesium oxide and iron oxide; and carbon blacks, such as acetylene black, lamp black, and furnace black, which blacks are not sequestered when brought into contact with a plasticizer. Channel black, for example, when blended with commonly used plasticizers prior to compounding rubber, may not be used inasmuch as it apparently is sequestered by the plasticizer. The usual type of fillers which will give satisfactory compounding compositions in accordance with this invention are termed, for the purpose of defining the invention, as those which are not sequestered by plasticizers. Channel black may, of course, be used in the usual manner in its untreated form.

For the sake of clarity it should be stated that a filler is called sequestered if its reinforcing properties are substantially degraded when mixed with a plasticizer prior to incorporation into the plastic mass if the ratio of filler to plasticizer in the composition is such that upon the incorporation of the composition into the thermoplastic mass, the plasticity of the said mass becomes lower.

A wide variety of materials can be used as the plasticizer component of the compounding compositions. These include soft resins, fatty oils, mineral oils, tar products, and especially the products recently known in the rubber trade under the general classification, extenders or extender-plasticizers. For some purposes, a mixture of two or more plasticizers is advantageously employed. Free fatty acids and similar acid substances such as lauric, palmitic and stearic acids are sometimes added to the rubber and rubber-like substances in small amounts not exceeding 5%. They are added for the purpose of chemically activating the accelerators usually added to rubber and rubber-like compounds. Any plasticizing effect they may have is a secondary effect. Such fatty acids and similar substances are not to be considered as plasticizers within our invention.

The extender-plasticizers which are unsaturated hydrocarbon compositions and which may be derived from the unsaturated components which are removed from lubricating oil fractions during refining are economic and readily available. They are compatible with the rubber and other thermoplastic masses with which the filler-plasticizer compositions of the invention may advantageously be used. For these reasons, these extender-plasticizers are used in the illustrative examples. Other useful plasticizers could be used however.

The compounding compositions of the invention are particularly useful for incorporation into or with natural rubber, synthetic rubbers such as butadiene-styrene or butadiene-acrylonitrile copolymers, other rubbers and rubber-like materials, thermoplastics and other elastomers such as the polyvinyl materials and the like which are capable of forming products which are both extensible and elastic when compounded and cured according to methods known in the rubber and related arts. In general the plasticity of these materials is in the range of about 100 to about 450, by the Scott method mentioned hereinbefore.

The production of the various filler-plasticizer compositions can be accomplished in many ways. One method, which has been found to be very practical on either a small or a large scale, is a continuous process in which the components are fed in metered proportions into one end of a vessel which is equipped with mixing blades, the blend thoroughly mixed, and the resulting mass continuously discharged from the vessel into a revolving screen which continuously separates the dust and the lumps from the pellets. This process operates with a minimum power consumption and a minimum labor requirement. It delivers a substantially uniform product. The dust (particles below 60 mesh) and lumps (particles above 4 mesh) may be recycled through the mixing vessel.

The product obtained by this process is in the form of small pellets. Compositions can be produced in the form of large balls or briquets, or in any other form convenient for handling, in accordance with the invention. For instance, briquets can be obtained by mixing the dust and lumps obtained from the screening process and pressing the mixture into briquet form. The composition may be briquetted after it leaves the mixing vessel, thus eliminating screening.

In order to illustrate the invention, the following examples are included. However, they are not to be construed in any way as limitations of the invention as otherwise disclosed and claimed herein.

One series of rubber compositions was made up according to the formulations given in the Table I, and then vulcanized. The plasticity and time of mixing were noted for each composition. The plasticity of the GR-S used was 250 after 10 minutes mastication. The resulting vulcanized products were tested for the physical properties indicated in the following table:

Table I

| Example No. | 1 | 2 | 3 | 4 | 5 |
|---|---|---|---|---|---|
| GR-S | 100 | 100 | 100 | 100 | 100 |
| Stearic Acid | 0.5 | 0.5 | 0.5 | 0.5 | 0.5 |
| Filler-Plasticizer (73 parts furnace black per 27 parts by weight unsaturated hydrocarbon extender-plasticizer) | | 10 | 25 | 50 | 100 |
| Sulfur | 1.8 | 1.88 | 2.00 | 2.20 | 2.61 |
| Zinc Oxide | 5 | 5 | 5 | 5 | 5 |
| Benzothiazyl disulfide | 1.50 | 1.50 | 1.50 | 1.50 | 1.50 |
| Diphenyl guanidine | 0.25 | 0.25 | 0.25 | 0.25 | 0.25 |
| Plasticity | 250 | 245 | 260 | 240 | 240 |
| Time for incorporation of total plasticizer and filler (in minutes) | 2 | 4½ | 4¾ | 5½ | 6½ |

Physical properties of vulcanized products (Standard slabs were cured and tested according to A. S. T. M. procedures)

| Tensile strength p. s. i. (pounds per sq. in.) | 280 | 300 | 620 | 1,300 | 1,700 |
|---|---|---|---|---|---|
| Elongation, per cent | 310 | 360 | 400 | 520 | 470 |
| Shore hardness | 35 | 37 | 40 | 46 | 53 |

It is evident that the plasticity of the resulting mass remained substantially constant as the amount of filler-plasticizer composition (having 73 parts of filler per 27 parts by weight of the extender-plasticizer) was increased. Control compositions of similar formulations, but in which the filler and the plasticizer were added separately, required a much longer time for incorporation of plasticizer and filler.

Various ratios of carbon black and plasticizers have been tested as set forth in Table I. These ratios extend within the range of 5 to 27 parts of plasticizers and 95 to 73 parts of carbon black. A composition of plasticizer and furnace black containing 25±2% plasticizers has been found to be most practical for general compounding purposes. The most practical range for clay has been found to be 20±5%. The most practical range for carbonates has been found to be in the range of 17±8%. The range in the amount of oxides used would be relatively wide if expressed in parts by weight in view of the considerable differences in their characteristics.

Another series of rubber compositions was made up, vulcanized and tested, as indicated in Table II. The even numbered examples are the controls, in which filler and plasticizer were separately incorporated. One formulation is for a soft rubber product, and the other for a hard rubber type product.

Table II

| | Soft Rubber | | Hard Rubber | |
|---|---|---|---|---|
| Example No. | 6 | 7 | 8 | 9 |
| GR-S | 100 | 100 | 100 | 100 |
| Stearic acid | 1 | 1 | 1 | 1 |
| Clay | 75 | | 75 | |
| Unsaturated hydrocarbon extender-plasticizer | 25 | | 25 | |
| Filler-plasticizer (75 parts clay per 25 parts unsaturated hydrocarbon extender-plasticizer) | | 100 | | 100 |
| Sulfur | 2.55 | 2.55 | 42 | 42 |
| Benzothiazyl disulfide | 1.50 | 1.50 | | |
| Diphenyl guanidine | 0.25 | 0.25 | | |
| Accelerator [1] | | | 2 | 2 |
| Accelerator [2] | | | 0.10 | 0.10 |
| Zinc oxide | 3 | 3 | | |
| Time for incorporation of total plasticizer and filler (in minutes) | 40 | 21 | 34 | 19 |
| Cure | 80 min. at 45# | | 120 min. at 80# (steam pressure in the heating jacket) | |

[1] A butyraldehyde-aniline condensation product.
[2] Piperidinium pentamethylenedithiocarbamate.

Physical properties of vulcanized products (Standard slabs were cured and tested according to A. S. T. M. procedures)

| Tensile strength, p. s. i. | 930 | 920 | 6,300 | 7,000 |
|---|---|---|---|---|
| Elongation, per cent | 740 | 760 | 3 | 5 |
| Hardness: | | | | |
| Shore durometer A | 40 | 38 | | |
| Shore durometer D | | | 86 | 85 |

The controls required nearly twice as much milling time as did the rubber compositions prepared from the new filler-plasticizer compositions. The final products were substantially similar as to the physical properties tested for each type. Thus, by means of the new filler-plasticizer compositions, the mill output can be nearly doubled with the same equipment and labor.

Of course, the plasticity values mentioned herein, as determined on the Scott plastometer, may be expressed in the equivalent values as determined by other methods such as the Mooney method or the Williams method.

In view of the foregoing, variations or modifications will be apparent to those skilled in the art. The invention includes all such variations or modifications that are within the scope of the appended claims.

We claim:
1. The method which comprises masticating premixed compounding composition consisting of powdered pigment filler and unsaturated hydrocarbon extender-plasticizer into a rubbery material selected from the group consisting of natural rubber, butadiene-styrene co-polymers and butadiene-acrylonitrile co-polymers having a Scott plasticity in the range of 100 to 450, which produces an extensible and elastic material when vulcanized with sulfur, the amount of extender-plasticizer in said compounding composition being in the range of 5 to 27 parts of extended-plasticizer per 95 to 73 parts of total filler, the ratio of filler to plasticizer in said compounding composition being such that the total plasticity decreasing effect of the filler on a butadiene-styrene co-polymer having a Scott plasticity in the range of 100 to 450 at least balances the total plasticity increasing effect of the extender-plasticizer on said co-polymer, all the filler being powdered and one whose reinforcing properties are not degraded when so premixed with the extender-plasticizer in the said proportions, the extender-plasticizer being an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining.

2. The method which comprises masticating premixed compounding composition consisting of powdered pigment filler and unsaturated hydrocarbon extender-plasticizer into a butadiene-styrene co-polymer having a Scott plasticity in the range of 100 to 450, which yields an extensible and elastic material when vulcanized with sulfur, the amount of extender-plasticizer in said compounding composition being in the range of 5 to 27 parts of extender-plasticizer per 95 to 73 parts of total filler, the ratio of filler to plasticizer in said compounding composition being such that the total plasticity decreasing effect of the filler on said co-polymer at least balances the total plasticity increasing effect of the extender-plasticizer on said co-polymer, all the filler being powdered and one whose reinforcing properties are not degraded when so premixed with the extender-plasticizer in the said proportions, the extender-plasticizer being an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining.

3. The method which comprises masticating premixed compounding composition consisting of filler and unsaturated hydrocarbon extender-plasticizer into a butadiene-acrylonitrile co-polymer having a Scott plasticity in the range of 100 to 450, which yields an extensible and elastic material when vulcanized with sulfur, the amount of extender-plasticizer in said compounding composition being in the range of 5 to 27 parts of extender-plasticizer per 95 to 73 parts of total filler, the ratio of filler to plasticizer in said compounding composition being such that the total plasticity decreasing effect of the filler on a butadiene-styrene co-polymer having a Scott plasticity in the range of 100 to 450 at least balances the total plasticity increasing effect of the extender-plasticizer on said co-polymer, all the filler being powdered and one whose reinforcing properties are not degraded when so premixed with the extender-plasticizer in the said proportions, the extender-plasticizer being an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining.

4. The method which comprises masticating premixed compounding composition consisting of powdered pigment filler and unsaturated hydrocarbon extender-plasticizer into a natural rubber having a Scott plasticity in the range of 100 to 450, the amount of extender-plasticizer in said compounding composition being in the range of 5 to 27 parts of extender-plasticizer per 95 to 73 parts of total filler, the ratio of filler to plasticizer in said compounding composition being such that the total plasticity decreasing effect of the filler on a butadiene-styrene co-polymer having a Scott plasticity in the range of 100 to 450 at least balances the total plasticity increasing effect of the extender-plasticizer on said co-polymer, all the filler being powdered and one whose reinforcing properties are not degraded when so premixed with the extender-plasticizer in the said proportions, the extender-plasticizer being an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining.

5. The method which comprises masticating premixed compounding composition consisting of furnace black filler and unsaturated hydrocarbon extender-plasticizer into a rubbery material selected from the group consisting of natural rubber, butadiene-styrene co-polymers and butadiene-acrylonitrile co-polymers having a Scott plasticity in the range of 100 to 450, the amount of extender-plasticizer in said compounding composition being in the range of 23 to 27% of the weight thereof, the ratio of filler to plasticizer in said compounding composition being such that the total plasticity decreasing effect of the filler on a butadiene-styrene co-polymer having a Scott plasticity in the range of 100 to 450 at least balances the total plasticity increasing effect of the extender-plasticizer on said co-polymer, all the filler being powdered and one whose reinforcing properties are not degraded when so premixed with the extender-plasticizer in the said proportions, the extender-plasticizer being an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining.

6. The method which comprises masticating premixed compounding composition consisting of powdered clay filler and unsaturated hydrocarbon extender-plasticizer into a rubbery material selected from the group consisting of natural rubber, butadiene-styrene co-polymers and butadiene-acrylonitrile co-polymers having a Scott plasticity in the range of 100 to 450, the amount of extender-plasticizer in said compounding composition being in the range of 15 to 25% of the weight thereof, the ratio of filler to plasticizer in said compounding composition being such that that the total plasticity decreasing effect of the filler on a butadiene-styrene co-polymer having a Scott plasticity in the range of 100 to 450 at least balances the total plasticity increasing effect of the extender-plasticizer on said co-polymer, all the filler being powdered and one whose reinforcing properties are not degraded when so premixed with the extender-plasticizer in the said proportions, the extender-plasticizer being an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining.

7. The method which comprises masticating premixed compounding composition consisting of powdered whiting filler and unsaturated hydrocarbon extender-plasticizer into a rubbery material selected from the group consisting of natural rubber, butadiene-styrene co-polymers and butadiene-acrylonitrile co-polymers having a Scott plasticity in the range of 100 to 450, the amount of extender-plasticizer in said compounding composition being in the range of 9 to 25% of the weight thereof, the ratio of filler to plasticizer in said compounding composition being such that the total plasticity decreasing effect of the filler on a butadiene-styrene co-polymer having a Scott plasticity in the range of 100 to 450 at least balances the total plasticity increasing effect of the extender-plasticizer on said co-polymer, all the filler being powdered and one whose reinforcing properties are not degraded when so premixed with the extender-plasticizer in the said proportions, the extender-plasticizer being an unsaturated hydrocarbon mass having approximately 90% of carbon and 10% of hydrogen and substantially free of fractions having a boiling point of less than about 160° C. at 12 mm. Hg, of the class consisting of components derived from the extract separated in the solvent refining of mineral oils and components separated by the distillation of neutralized acid sludge of petroleum oil refining.

FRITZ S. ROSTLER.
HUBERT I. DU PONT.

REFERENCES CITED

The following references are of record in the file of this patent:

UNITED STATES PATENTS

| Number | Name | Date |
|---|---|---|
| 1,405,439 | Randall | Feb. 7, 1922 |
| 2,000,028 | King | May 7, 1935 |
| 2,358,290 | Kraft | Sept. 12, 1944 |
| 2,373,461 | Crampton | Apr. 10, 1945 |
| 2,381,248 | Bascom | Aug. 7, 1945 |

OTHER REFERENCES

"Properties Processing and Compounding of Hycar," Rubber Age, Feb. 1941, pp. 315 to 318.

Rostler et al.: India Rubber World, vol. 104 (Aug. 1941), pp. 47 to 51.

Crosby: India Rubber World, vol. 106 (May 1942), pp. 133 to 135.

India Rubber World, advertisement, Apr. 1943, page 9.

Gardner: Physical and Chemical Examination of Paints and Varnishes, Lacquers and Colors, 9th ed. 1939, pp. 209 to 215.

Socony Vacuum Oil Co. Technical Bulletin, "Socony Vacuum Plasticizers for Synthetic Rubber," October 1944, page 2.